United States Patent [19]

Sutker et al.

[11] Patent Number: 4,619,961
[45] Date of Patent: Oct. 28, 1986

[54] HALOGENATED POLYPHENYL SULFIDE OR SULFIDE/ETHER COMPOUNDS

[75] Inventors: Burton J. Sutker, Edison; Saadat Hussain, East Brunswick; Amgad S. Mossaad, S. River, all of N.J.

[73] Assignee: Ethyl Corporation, Richmond, Va.

[21] Appl. No.: 686,486

[22] Filed: Dec. 26, 1984

[51] Int. Cl.$^4$ .................... C08K 5/36; C07C 149/34
[52] U.S. Cl. .................... 524/393; 106/18.23; 252/608; 523/453; 568/56
[58] Field of Search .................... 568/56; 525/537; 524/419, 393

[56] References Cited

U.S. PATENT DOCUMENTS

| | | | |
|---|---|---|---|
| 3,321,403 | 5/1967 | Campbell et al. | 252/48.2 |
| 3,387,040 | 4/1968 | Jolles | 568/56 |
| 3,429,932 | 2/1969 | Horvath | 568/56 |
| 3,748,269 | 7/1973 | Clark | 252/46.6 |
| 3,832,303 | 8/1974 | Clark | 252/46.6 |
| 3,843,532 | 10/1974 | Clark | 252/46.7 |
| 3,844,961 | 10/1974 | Clark | 252/46.7 |
| 3,844,962 | 10/1974 | Clark | 252/46.7 |
| 3,965,197 | 6/1976 | Stepniczka | 260/623 H |
| 3,987,016 | 10/1976 | Haddad et al. | 260/79.1 |
| 4,017,555 | 4/1977 | Alvarez | 525/537 |
| 4,046,836 | 9/1977 | Adelmann et al. | 525/537 |

FOREIGN PATENT DOCUMENTS 0009184  4/1980  European Pat. Off. ............. 568/33

OTHER PUBLICATIONS

Chem. Abstracts, Tenth Collective Index 1977-1981, pp. 2960CS and 2962CS.
G. Daccord et al., Chem. Abstract 96:35934s.
"J. Poly Sci.", Polymer Chem. Ed. 11(11) 2793-811: CAS Abstract.
Nekhoroshev et al., "Neftekhimiya 20(4) 599-602: CAS Abstract 94:30537p.
Furin et al., Zh. Org. Khim 11(6) 1290-7; CAS Abstract 83:78777s.
Montaudo et al., "J. of Poly Sci.", Polymer Chemistry Ed., 11, pp. 65-79 (1973).
Yakobson, et al., Zh. Org. Khim. 10(4) 799-804: CAS Abstract 81:25234q.
Cotter, AD Report, AD 457282 (U.S. Govt. Res. Dev. Rept. 1966): CAS Abstract 66:104519e.

Primary Examiner—Donald G. Daus
Assistant Examiner—Mary E. Ceperley
Attorney, Agent, or Firm—Donald L. Johnson; John F. Sieberth; Joseph D. Odenweller

[57] ABSTRACT

Organic materials are made flame retardant by addition of a polyhalogenated polyphenylene sulfide such as decabromodiphenyl sulfide or 1,4-thiobis(2,4,6-tribromophenyl)-2,3,5,6-tetrabromobenzene alone or in combination with a Group VA metal oxide, e.g. $Sb_2O_3$. A process for making the compounds is also disclosed.

4 Claims, No Drawings

HALOGENATED POLYPHENYL SULFIDE OR SULFIDE/ETHER COMPOUNDS

BACKGROUND OF THE INVENTION

Halogenated compounds have long been used as flame retardant additives in organic materials which would normally burn in air when contacted with an ignition source. One such additive is polybrominated diphenyl ether which can be made by adding diphenyl ether to bromine containing a catalyst such as aluminum chloride at temperatures above 35° C. according to U.S. Pat. No. 4,287,373. A related process that can be used to perbrominate benzene, toluene, phenol, xylene, biphenyl, biphenyl ether or biphenyl sulfide is shown in U.S. Pat. No. 3,965,197. Similar halogenated polyphenylene oxides are described in U.S. Pat. No. 3,760,003. These are made by the slow addition of bromine to a polyphenylene oxide containing a catalyst such as iron powder.

SUMMARY OF THE INVENTION

It has now been discovered that organic materials which normally burn in the presence of air and an ignition source can be made fire retardant by addition of a fire retardant amount of a polyhalogenated polyphenylene sulfide. It has been further discovered that these additives are not only very effective fire retardants but that organic compositions containing these new additives give less smoke when made to burn or smolder compared to the same organic materials containing known polybrominated polyphenylene oxides.

DESCRIPTION OF THE PREFERRED EMBODIMENTS

A preferred embodiment of the invention is a polyhalogenated polyphenylene sulfide fire retardant having at least three benzene rings connected through a thio or polythio bridge and having at least two halogen substituents per molecule wherein such halogens are chlorine, bromine or mixtures of chlorine and bromine. Such polyhalogenated polyphenylene sulfides can contain three or more benzene groups connected through a thio or polythio bridge. There is no real upper limit on the number of benzene groups because polyphenylene sulfides of very high molecular weight are known and can be polyhalogenated to give effective flame retardants of this invention. The polyphenylene sulfides contain at least two halogen atoms per molecule. In most cases the additives contain at least two halogen atoms per benzene ring. In a preferred embodiment the terminal benzene groups contain at least three halogen atoms and the internal benzene groups contain at least one halogen atom.

A highly preferred sub-class of the compounds of this invention can be defined by the structure

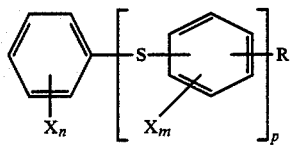

wherein X is chlorine, bromine or both chlorine and bromine, n is an integer from 1 to 5, m is an integer from 1 to 4, p is an integer from 2 to 50 and R is selected from hydrogen, chlorine and bromine. Although the halogen substituents can be either chlorine or bromine or mixtures of chlorine and bromine, it is more preferred that the halogens are bromine since these are more effective fire retardants.

The physical properties of the additives will vary with the degree of halogenation. Sometimes it is preferred to have less than complete halogenation for use in certain polymers because of enhanced performance, compatibility or U.V. resistance. Quite often the products are mixtures of various polyhalogenated polyphenylene sulfides in which the different components have different amounts of halogen substitution. In this case, the structure referred to means that the average composition corresponds to this structure and not that every molecule has this structure.

The more preferred additives are perhalogenated. Some examples of the fire retardants of this invention are as follows:

1,2-bis(2,4,6-tribromophenylthio)dibromobenzene
1,3-bis(2,4,6-tribromophenylthio)tribromobenzene
1,4-bis(pentabromophenylthio)tetrabromobenzene
1,4-bis(2,4,6-tribromophenylthio)tetrabromobenzene
1,3-bis(pentabromophenylthio)tetrabromobenzene
1,1'-thiobis[4-(2,4,6-tribromophenylthio)2,5-dibromobenzene]
di(4-pentabromophenylthio-2,3,5,6-tetrabromophenyl) sulfide
2-chloro-4,5-dibromophenyl 2-bromo-4,5-dichlorophenyl sulfide
2,3,5-tribromophenyl 2,3-dichloro-4,5,6-tribromophenyl sulfide and isomers of the above examples and chlorine substituted analogs.

Attempts to polybrominate polyphenylene sulfides by conventional methods can cause degradation by cleavage at the thio bridge. A new process has been developed which minimizes such degradation by first reacting the polyphenylene sulfide with bromine without the use of a bromination catalyst to partially brominate the polyphenylene sulfide. At this stage, a catalyst is added and the reaction is completed. Hence another preferred embodiment of the invention is a process for making a polybrominated polyphenylene sulfide with minimal cleavage of thio bonds, said process comprising;

(a) initially reacting a polyphenylene sulfide with liquid bromine at a temperature from ambient up to reflux in a substantially catalyst-free system to partially brominate said polyphenylene sulfide and then (b) adding a promoter amount of a Lewis acid catalyst and optionally adding additional bromine and reacting the mixture at a temperature of about 40° up to reflux to complete the polybromination the total amount of bromine used being at least a 200 percent stoichiometric excess over that required to perbrominate said polyphenylene sulfide.

In the first stage, the polyphenylene sulfide is slowly added to an excess of liquid bromine. The amount of liquid bromine should be at least 150 percent of the stoichiometric amount required to completely brominate the polyphenylene sulfide. This amount can also be referred to as a 50 percent stoichiometric excess. A more preferred amount of bromine is about 150 to 400 and most preferably about 200 to 300 percent of the stoichiometric amount for perbromination. No bromination catalyst is added in the first stage. The bromine can be at any temperature from ambient up to reflux (approx. 60° C.). The polyphenylene sulfide can be added as a finely divided solid or as a liquid. If it had a low melting point such as that of diphenyl sulfide, it can be added as a liquid. Optionally, the polyphenylene sulfide can be warmed slightly up to about 100° C. to put it into a liquid form if it melts below that temperature. Of course if it melts above the bromine temperature, it will solidify after addition but will still be brominated in the process since it will form a very finely divided dispersion in bromine. Preferably the reaction is started with the bromine temperature at ambient up to about 40° C. and as the polyphenylene sulfide addition progresses it is allowed to warm up to a gentle reflux. After completion of the polyphenylene sulfide addition, the mixture is stirred at about 40° up to reflux, preferably at reflux, for a period of 30 minutes up to about 8 hours. The mixture is then cooled in preparation for the second stage of the process.

In the second stage, the amount of bromine can be adjusted although this is not necessary if sufficient bromine was charged in the first stage. Overall, the amount of bromine should be about 200-400 percent of the stoichiometric amount required for perbromination. After any bromine adjustment, a bromination catalyst is added. This is preferably a Lewis acid or a metal that will form a Lewis acid in the reaction mixture. Useful catalyst include $AlCl_3$, $FeCl_3$, $BCl_3$, $SnCl_4$, $ZnCl_2$, $AlBr_3$, $FeBr_3$, $BBr_3$, $SnBr_4$, $ZnBr_2$, Al, Fe, Zn and the like. Excellent results have been achieved using aluminum chloride.

The amount of catalyst should be an amount sufficient to catalyze the continued bromination of the partially brominated polyphenylene sulfide. This is referred to as a catalytic amount. A useful range is about 1-10 weight percent of the starting material. A more preferred range is about 2-8 weight percent of the starting material.

The reaction mixture is then stirred and heated to a temperature of about 40° C. up to reflux. It is preferably heated and maintained at reflux for a period sufficient to complete the desired degree of bromination. Good results can be achieved with a 30 minute to 8 hour reaction period after catalyst addition.

Products can be recovered by any conventional method. One such method is to add water and then distill out unreacted bromine. The high melting powder product can be recovered by filtration and is preferably washed with more water. It can then be dried at an elevated temperature of about 75°-150° C. until dry and until unreacted bromine vaporizes from the product. Grinding to a particle size under 20 micron and more preferably under 10 micron is also beneficial.

The following examples illustrate the novel process of brominating polyphenylene sulfides.

EXAMPLE 1

In a reaction vessel fitted with a stirrer, reflux condensor, thermometer and addition funnel was charged 223.7 (1.4 moles) of bromine. Then 14.7 grams (0.05 moles) of 1,3-bis(phenylthio)benzene was added to the reaction vessel slowly at room temperature over a 1 hour period. The stirred mixture was then heated to reflux and stirred at reflux for 4 hours.

The reaction mixture was then cooled and 1.5 grams of anhydrous aluminum chloride was added. The stirred mixture was then heated to reflux for an additional 6 hours. At the end of the reflux period, water was added and bromine was distilled out. The product was removed by filtration and washed with water and then dried in an oven at 100° C. for 4 hours giving a 90 percent yield of an orange polybrominated polyphenylene sulfide melting at 202°-226° C. The product was then oven-aged at 150° C. for 16 hours to give a tan colored product which analyzed 80.7 weight percent bromine.

EXAMPLE 2

In a reaction vessel as above was placed 223.7 grams (1.4 moles) of bromine. Molten 1,4-bis-(phenylthio)benzene (85° C.) was added dropwise over a 1 hour period while stirring. The mixture was then heated to reflux and maintained at that temperature for 4 hours. The mixture was then cooled to room temperature and 1.5 grams of anhydrous aluminum chloride was added. The mixture was again heated and refluxed for an additional 6 hours. The mixture was then cooled and water added and bromine distilled off. The solid product was recovered by filtration, washed with water and oven-dried at 100° C. for 4 hours to give a tan product in 99.4 percent yield of polybrominated 1,4-bis(phenylthio)benzene having a melting point of 295°-310° C. This product was dissolved in hot toluene and stirred for 30 minutes and then filtered. This product was oven-aged at 240° C. for 16 hours to remove residual bromine. The light tan product obtained in 90.2% yield was analyzed 82.4 weight percent bromine.

EXAMPLE 3

In a reaction vessel as above was placed 489 grams (3.06 moles) of bromine. Liquid diphenyl sulfide (18.6 grams, 0.102 moles) was added dropwise over a 1.5 hour period while stirring. The mixture was then heated to bromine reflux and refluxed for 6 hours. The mixture was then cooled to room temperature and 1.3 grams of anhydrous aluminum chloride was added. The mixture was again heated and refluxed for an additional 6 hours. The mixture was then cooled and ethylene dichloride was added. This mixture was heated to distill off unreacted bromine. The product was recovered by filtration and washed with ethylene dichloride. The washed product was oven-dried at 100° C. for 4 hours to give an orange polybrominated diphenyl sulfide in 96.6 percent yield having a 320°-330° C. melting point. This product was oven-aged at 240° C. for 16 hours to give a light tan product which analyzed 81 weight percent bromine.

EXAMPLE 4

This example was conducted in the same manner as Example 1 except that the starting polyphenylene sulfide was 1,2-bis(phenylthio)benzene and the crude product first recovered was extracted in hot toluene and then filtered to remove insoluble product. The filter cake was oven-aged at 240° C. for 16 hours to give a light tan polybrominated 1,2-bis(phenylthio)benzene in 92 percent yield which analyzed 81.4 weight percent bromine and had a melting point of 290°-300° C.

EXAMPLE 5

In a reaction vessel was placed 215.8 grams (1.35 moles) of bromine. To this was added molten 1,1'-thiobis[3-(phenylthio)benzene] maintained at 85° C. The addition was carried out at room temperature over a 1 hour period. The contents were then heated to reflux and maintained at reflux for 3 hours. The mixture was then cooled and 1.2 grams of aluminum chloride was added. The reaction mixture was again heated and refluxed for an additional 6 hours and then cooled to room temperature. Water was added and bromine was distilled out. The product was recovered by filtration. The product was washed with water and dried in an oven to give an orange material in 98.7 percent yield. The crude product was washed with ethylene dichloride to give a polybrominated 1,1'-thiobis-[3-(phenylthio)benzene] in 77 percent yield having a melting point of 194°–210° C. The final product analyzed 78.6 percent bromine.

It is not essential to use the two-stage process to make useful polyhalogenated polyphenylene sulfide within the scope of the present invention. Useful fire retardants have been made by merely adding solid or liquid polyphenylene sulfide to a 50–300 percent stoichiometric excess of liquid bromine and stirring the mixture at reflux for a period of about 4–12 hours. In essence, this is similar to the first stage of the two-stage process. The second stage is omitted with the result that the product is not completely brominated but is still a very useful fire retardant. The following example illustrates this simplified procedure.

EXAMPLE 6

In a reaction vessel was placed 113.2 grams (0.776 moles) of bromine. The stirred bromine was cooled to 10° C. and then 10 grams of poly(phenylenesulfide) was added in small portions over a period of 30 minutes. The contents were stirred and heated to reflux and maintained at reflux for 6 hours. In order to facilitate agitation, an additional 20 mLs of bromine was added after the first 2 hours of reflux. Another 20 mLs of bromine was added after a total of 4 hours of reflux. After completion of the reflux period, ethylenedichloride was added and unreacted bromine was distilled out. The mixture was then cooled to room temperature, filtered, the filtered cake was washed with ethylenedichloride and then air-dried followed by oven-drying at 100° C. for 3 hours. This gave 19.6 grams of a dark tan polybrominated poly-(phenylenesulfide) melting at 320°–330° C.

The new additives can be used as fire retardants by mixing them into the organic substrate to be protected or they can be applied as an aqueous emulsion to the surface of the organic substrate, especially to fabrics or textiles, together with a dispersing agent, a binder and other conventional latex additives and then heated to incorporate the fire retardant into the textile surface. With thermosetting plastics the fire retardants are usually compounded with the uncured polymer composition and then the compounded mixture is heated to cure or cross-link the polymer. Thermoplastic polymers can be merely mixed in a finely divided form with the fire retardant powder and any other adjuvants including antimony oxide and the mixture heated to form a homogenous composition. Many other ways of applying the fire retardant or incorporating the fire retardant on or into the organic materials are well known in the art.

The fire retardant can be used with any organic material which would normally burn or smolder in air. These include cotton fabrics, wood fiber, wood particle board, bagase fiberboard, cellulose insulation, paper and the like. The fire retardants are most often used in organic polymers such as polyethylene, polypropylene, linear low density polyethylene, ethylene propylene copolymer, ethylene propylene diene terpolymer, cis and trans polybutadiene, polystyrene, rubber modified polystyrene or high impact polystyrene, acrylonitrile-butadiene-styrene terpolymer, styrene-butadiene copolymer, styrene-maleic anhydride copolymer, polyphenylene ethers, polycarbonates, polyamides, polyimides, polyepoxides, polyurethanes, polyesters, phenol-formaldehyde resins, urea-formaldehyde resins, melamine-formaldehyde resins and the like. The amount of fire retardant in the substrate should be an amount which provides the required degree of fire protection. This varies in different applications. A usual concentration range is about 1–20 weight percent fire retardant and a more general concentration range is about 5–15 weight percent fire retardant.

The fire retardants are frequently used in combination with a synergistic amount of a Group VA metal oxide, especially antimony oxide. The amount of such metal oxide is in the range of about 2–10 weight percent of the final composition. A preferred range is about 4–6 weight percent and a most preferred amount is about 3–5 weight percent. Other synergists or adjuvants that are sometimes use include zinc oxide, zinc borate, boric acid and the like.

Tests have been conducted which show the good fire retardant and exceptionally low smoke values of organic polymers which contain the novel flame retardants. The substrate used in the tests was a commercial rubber-modified polystyrene commonly referred to as a high impact polystyrene ("HIPS"). Each test specimen consisted of 42 parts by weight HIPS, 6 parts fire retardant, and 2 parts antimony oxide.

The first test was the Underwriters Laboratory UL-94 Test in which each specimen is held vertically and a flame is applied at the bottom edge. The specimens are given a rating based on burn time, flame drip and afterglow. The ratings are V-0 (best), V-1, V-2 and burn (worst).

The smoke rating of the specimen was determined using the National Bureau of Standard Smoke Test (ASTM E662) which measures obscuration time, maximum smoke density and accumulation rate.

UV stability was measured by exposing a compression molded plaque to UV radiation and measuring polymer discoloration using a sunlighter Model 150 and the yellow index (YI) initial and final.

The following table gives the results of the various tests with different formulations:

| Fire Retardant | Smoke Rating | | | | UV Rating Y.I. | | |
|---|---|---|---|---|---|---|---|
| | UL-94 | Dm[1] | T-16[2] | SOI[3] | Initial | Final | Δ E |
| Example 1 | V-O | 207 | 4.9 | 6.8 | 36.1 | 121.6 | 30.30 |
| Example 2 | V-O | 232 | 5.3 | 8.20 | 29.8 | 74.3 | 19.61 |
| Example 4 | V-O | 253 | 5.2 | 8.4 | 23.0 | 62.5 | 16.15 |
| Example 5 | V-O | 309 | 4.7 | 13.2 | 40.1 | 130.5 | 26.1 |
| Comparative[4] | V-O | 446 | 5.1 | 25.9 | 17.6 | 38.2 | 10.79 |
| Comparative[5] | V-O | 349 | 5.8 | 19.8 | 9.3 | 73.6 | 28.91 |
| Comparative[6] | V-O | 329 | 5.6 | 13.2 | — | — | — |

[1] Dm means maximum smoke density.
[2] T-16 means time, in minutes, to reach 75% transmittance which is equivalent to Dm 16
[3] SOI means Smoke Obscuration Index.
[4] Perbrominated 1,4-diphenoxybenzene
[5] Decabromodiphenyl oxide
[6] Perbrominated diphenylsulfide As these results show, all of the additives including the comparative additives are very effective fire retardants.

The results show that the additives of this invention in addition have significantly improved smoke ratings compared to the prior art additives.

We claim:

1. A composition comprising a high impact rubber-modified polystyrene containing a fire retardant amount of a perbrominated polyphenylene sulfide having the structure:

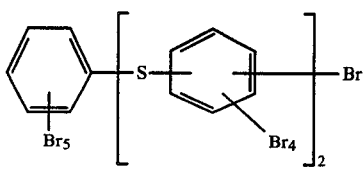

2. A composition of claim 1 wherein said perbrominated polyphenylene sulfide is perbrominated 1,4-bis(phenylthio)benzene.

3. A composition of claim 1 wherein said perbrominated polyphenylene sulfide is perbrominated 1,3-bis(phenylthio)benzene.

4. A composition of claim 1 wherein said perbrominated polyphenylene sulfide is perbrominated 1,2-bis(phenylthio)benzene.

* * * * *